United States Patent [19]

Absil et al.

[11] Patent Number: 4,837,397
[45] Date of Patent: Jun. 6, 1989

[54] NOBILE METAL CONTAINING CATALYSTS OF IMPROVED STABILITY

[75] Inventors: Robert P. L. Absil, Mantua; Yun-Yang Huang, Voorhees, both of N.J.

[73] Assignee: Mobil Oil Corporation, New York, N.Y.

[21] Appl. No.: 131,596

[22] Filed: Dec. 11, 1987

[51] Int. Cl.$^4$ .......................... B01J 29/12; B01J 29/32
[52] U.S. Cl. ......................................... 502/66; 502/74
[58] Field of Search .................................... 502/66, 74

[56] References Cited

U.S. PATENT DOCUMENTS

| | | | |
|---|---|---|---|
| 3,072,563 | 1/1963 | Hickson | 208/120 |
| 3,833,499 | 9/1974 | Egan et al. | 502/66 |
| 4,060,480 | 11/1977 | Reed et al. | 208/111 |
| 4,248,739 | 2/1981 | Vaughan et al. | 502/84 |
| 4,255,288 | 3/1981 | Cull et al. | 502/66 |
| 4,259,212 | 3/1981 | Gladrow et al. | 208/120 |
| 4,443,553 | 4/1984 | Chiang et al. | 502/64 |
| 4,551,438 | 11/1985 | Miller | 502/67 |
| 4,568,655 | 2/1986 | Oleck et al. | 502/67 |
| 4,615,997 | 10/1986 | Chen et al. | 502/74 |

OTHER PUBLICATIONS

"Zirconium in Catalysis-Its Uses and Potential", Burch, R., Brochure of Magnesium Elektron, undated.
Bull Chem. Soc. Jpn. 54, 13-19 (1981).
Bull. Chem. Soc. Jpn. 54, 3711-3716 (1981).
Bull. Chem. Soc. Jpn. 57, 1283-1289 (1984).

Primary Examiner—Carl F. Dees
Attorney, Agent, or Firm—Alexander J. McKillop; Charles J. Speciale; Malcolm D. Keen

[57] ABSTRACT

The addition of a compound containing a complex cation of zirconium to a zeolite improves the properties of the zeolite and also improves the dispersibility characteristics of nobel metal components supported in the zeolite. The preferred zirconium compounds are the hydroxychlorides of zirconium and of zirconium and aluminum.

20 Claims, No Drawings

NOBILE METAL CONTAINING CATALYSTS OF IMPROVED STABILITY

FIELD OF THE INVENTION

This invention relates to noble metal containing catalysts useful for hydrocarbon conversion reactions and more especially to catalysts of this type which have a noble metal supported on a zeolite support.

CROSS-REFERENCE TO RELATED APPLICATIONS

Co-pending application Ser. No. 131,595 filed concurrently relates to zeolite compositions of improved stability containing aluminum and aluminum/zirconium complex cations.

BACKGROUND OF THE INVENTION

Supported metal catalysts possessing hydrogenation-dehydrogenation functionality have found many applications in petroleum refining processes. In these catalysts, a metal or metal compound which provides hydrogenation-dehydrogenation function is supported on a porous, inorganic oxide support such as alumina, silica, silica-alumina or a crystalline material with defined porosity characteristics such as one of the aluminosilicate zeolites. The support may itself possess catalytic activity e.g. acidic (cracking) activity so that the catalyst as a whole is bifunctional. Typical metals used in these catalysts include noble metals such as platinum, rhenium, iridium and palladium and base metals, especially those of Groups VIA and VIIIA of the Periodic Table (IUPAC Table), especially nickel, cobalt, molybdenum, tungsten and vanadium. Catalysts of this type are conventionally used in petroleum refining and petrochemical processes such as reforming, hydroprocessing e.g. hydrotreating, hydrofinishing, hydrocracking, isomerisation and dewaxing.

In many of these processes, the catalyst becomes deactivated during use because coke (a highly carbon-rich hydrocarbon) becomes deposited on the catalytic sites which then are no longer accessible to the reacting species. Deactivation may also ensue from agglomeration of the metal component under severe conversion conditions especially high temperature or by deposition by poisons. In order to restore catalytic activity and selectivity, the coke is removed either periodically or continuously, by oxidative regeneration; the coke-containing catalyst is exposed to a stream of oxygen-containing gas, usually air, which burns the coke off the support. At the same time, many poisons are driven off under the high temperatures which prevail during the regeneration. Oxidative regeneration techniques are widely known and are described, for example, in U.S. Pat. Nos. 3,069,362; 3,069,363 and British Pat. No. 1,148,545.

Another restorative technique is hydrogen reactivation, which is commonly employed between oxidative regenerations to remove accumulated coke or adsorbed material which can lower catalyst activity. Under the conditions employed in treatments of this kind, the hydrogen reacts with the coke to form hydrogen-enriched compounds which are more mobile and which are removed from the catalyst while adsorbed catalyst poisons are removed by the stripping action of the hydrogen. The hydrogen may be used as such or mixed with inert gases or gas mixture such as nitrogen, methane, carbon dioxide, carbon monoxide or flue gas as described, for instance, in U.S. Pat. Nos. 4,358,395 and 4,508,836. Hydrogen treatment may also precede an oxidative regeneration treatment.

One problem which is commonly encountered with these restorative treatments is metal agglomeration. This problem, which is particularly severe with the catalysts containing mobile metals, especially platinum and palladium, arises from the use of the high temperatures conventionally associated with oxidative regeneration and with certain hydrogen treatments. Metal agglomeration may also occur if high temperatures are encountered during the actual proessing step before the regeneration. When agglomeration of the metal component occurs, the particles of the metal component which originally are present in a highly dispersed state of the catalyst coalesce into perceptibly larger particles. As a result of this phenomenon, the catalyst tends to lose activity and selectivity because many of the reactions requiring bifunctional catalysis rely upon the proximity of the two types of catalytic site for the appropriate mechanistic steps to proceed.

Processes for redispersing metal components on the support are known and are generally referred to as rejuvenation processes. They are commonly used for reforming catalysts which encounter high temperatures during the endothermic reforming process. Typically, these rejuvenative techinques employ a halogen to redistribute the noble metal component which tends to agglomerate at the high temperatures associated with reforming and oxidative regeneration. Examples of rejuvenative processes may be found in U.S. Pat. Nos. 2,906,702; 3,134,732 and 3,986,982. Reference is also made to "Catalyst Deactivation and Regeneration:, *Chemical Engineering*, 91, No. 23, 12 November 1984. Another typical rejuvenative process is described in U.S. Pat. No. 3,134,732 (Kearby): a coked platinum catalyst on an alumina support is oxidatively regenerated and then contacted with gaseous halogen at a maximum temperature of 1250° F. (675° C.) to reduce the crystallite size of the platinum.

Rejuvenation processes such as these may be regarded as at best remedial: they attempt to alleviate the problem only after it has arisen. An alternative approach is prophylactic, to prevent the problem arising by improving the stability of the dispersed metal component so that it does not agglomerate. It is known that the interaction between the metal component and the substrate will affect the bonding of the metal crystallites. For example, noble metals sinter onto silica supports more strongly than onto alumina supports as discussed in J. Catalysis 55, 348–360 (1978) and AIChE Paper "Sintering/Redispersion in Supported Metal Catalysts: Phenomena and Analyses," Dadyburjor et al. AIChE 1983. See also S. J. Tauster: "Strong Metal-Support Interactions," Ed. by R. T. Baker, S. J. Tauster, and J. A. Dumesic, ACS Symposium Series 298, American Chemical Society, Washington, D.C., 1986, Chapter 1, p. 1.

The present invention is directed to a technique for improving the dispersability of metal components on zeolitic catalyst supports by modifying the composition of the support.

SUMMARY OF THE INVENTION

It has now been found that the dispersability characteristics of noble metals on zeolitic supports may be improved by the addition of zirconium complex compounds during the preparation of the support material.

According to the present invention there is therefore provided a noble metal containing catalyst of improved dispersability characteristics which comprises a noble metal component dispersed on a porous support comprising a zeolite and a compound of zirconium. These catalysts are prepared by the addition of a compound containing a complex cation of zirconium to the zeolite during the preparation of the catalyst. The noble metal component is also added to the catalyst, suitably by conventional techniques including addition of a noble metal compound while the zeolite is composited with a binder, followed by activation e.g. by calcination and reduction of the noble metal compound or by ion-exchange of impregnation.

The preferred zirconium complex compounds are the zirconium hydroxychloride complexes. The preferred noble metal components are platinum and palladium since these find many catalytic utilities. The preferred zeolite supports are the intermediate pore size zeolites such as ZSM-5, either alone or admixed with a binder such as alumina, silica or silica-alumina.

DETAILED DESCRIPTION

The present invention provides noble metal containing catalysts in which a noble metal component is supported on a porous catalyst support comprising a zeolite which has been composited with a complex compound of zirconium. The zirconium complex compound not only improves the dispersability characteristics of the noble metal component but also improves the hydrothermal stability of the catalyst as described in co-pending Application Ser. No. 131,595, to which reference is made for a description of the stabilising effect of such complex compounds). In this way, the performance of the catalyst is improved in two significant respects.

The noble metal components which may be used in the present catalysts are selected from Groups IB, VIIA, and VIIIA of the Periodic Table (IUPAC Table) as shown in Fisher Scientific Company Catalog No. 5-702-10 with atomic weights of at least 100. The most common catalytically active noble metals are palladium, rhenium, iridium, platinum and gold and for hydrocarbon conversion processes platinum and palladium are generally the most useful. These metals, especially platinum and palladium, are highly active for hydrogenation-dehydrogenation reactions with hydrocarbon feedstocks and as such find utility in many hydrocarbon conversion processes such as reforming, hydrotreating, hydrocracking, hydrofinishing, dewaxing and isomerisation, as described above.

The amount of the noble metal hydrogenation-dehydrogenation component is selected according to the balance of hydrogenation/dehydrogenation and acidic functionality desired with a bifunctional catalyst and according to the hydrogenation/dehydrogenation activity desired with a monofunctional catalyst. Less of the metal is required when the most active metals such as platinum are used as compared to palladium which does not possess such strong hydrogenation/dehydrogenation functionality. Generally, less than 10 wt. percent metal is used and often not more than 1 wt. percent. The noble metal may be incorporated into the catalyst by conventional techniques such as impregnation or ion exchange (or both) and may use solutions of simple or complex ions of the chosen metal e.g. complex cations such as $Pt(NH_3)_4^{2+}$.

Alternatively, a compound of the selected noble metal component may be added to the zeolite when it is being composited with a binder or matrix material and after the matrixed catalyst has been formed into particles e.g. by extrusion or pelletising, the noble metal component may be activated by reduction to the zero valent state in the conventional manner. The catalyst may be activated by calcination after drying the particles in order to remove organic components used in the synthesis of the zeolite, after which ion-exchange may be carried out as well as impregnation.

The support for the noble metal component comprises one or more zeolite, either alone or composited with a matrix material or binder. The zeolite may itself possess significant catalytic activity or it may be essentially inert so that the resulting catalyst is essentially monofunctional with an essentially inert support or bifunctional with an active support. If the zeolite possesses significant acidic activity (alpha in excess of about 1) the catalyst may be regarded as bifunctional with both acidic and hydrogenation/dehydrogenation functionality; such catalysts are useful in processes such as hydrocracking where the dual functionality is required. The monofunctional catalysts may also be useful where it is desired to carry out shape-selective hydrogenation/dehydrogenation reactions, the zeolite providing a shape selective support for the active hydrogenation/dehydrogeneration component (the phenomenon of shape selectivity is discussed in Chen et al. "Industrial Application of Shape Selective Catalysis", Catal. Rev.-Sci. Eng. 28 (2 & 3), 185-264 (1986)). Monofunctional catalysts of this kind may be used for reforming as well as hydrotreating and hydrofinishing processes. Thus, both types of supported noble metal catalyst may be useful according to the application at hand.

The support for the noble metal hydrogenation/dehydrogenation component therefore comprises a tleast one zeolite which may or may not have significant acidic (cracking) activity as measured by its alpha value. The method of determining alpha is described in U.S. Pat. No. 4,016,218 and in *J. Catalysis* VI, 278–287 (1966) to which reference is made for a description of the method.

The zeolites which may be used as the supports for the noble metal components may be characterised as small pore size, intermediate pore size or large pore size zeolites, depending upon the ring system of oxygen atoms in the framework structure of the zeolite. The small pore zeolites such as zeolite A and erionite have eight membered rings, the intermediate pore zeolites such as AZSM-5 have 10 membered rings and the large pore zeolites such as zeolites X and Y have 12 membered rings, as described in *J. Catalysis* 67, 218–222 (1981). The intermediate pore size zeolites, especially ZSM-5, have achieved significant commercial utility in hydrocarbon processing since their inception and for this reason are considered particularly suitable for compositing with zirconium compounds by the present technique. The preferred intermediate pore size zeolites for hydrocarbon processing include zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-23 (U.S. Pat. No. 4,076,842), the synthetic ferrierite zeolite ZSM-35 (U.S. Pat. No. 4,016,245), and zeolite ZSM-48 (U.S. Pat. No. 4,375,573). Large pore zeolites which may be used include zeolite X, zeolite Y, (including forms such as dealuminised Y, rare-earth exchanged Y, REY, and ultrastable Y, USY) and others having properties consistent with large pore size zeolites such as ZSM-4 (U.S. Pat. No. 3,923,639), ZSM-18 (U.S. Pat. No. 3,950,496) and zeolite beta (U.S. Pat. No. 3,308,069). Zeolite USY is described in U.S. Pat. Nos. 3,293,192 and 3,449,070 to which reference is made for a description of it. Zeolites containing a framework element other than, or in addition to, aluminum, e.g., boron, iron, titanium, zirconium, gallium, germanium, and the like, are also suitable. Such zeolites are described, for exmple, in U.S. Pat. Nos. 3,328,119; 3,329,480; 3,329,481; and 4,414,423; and 4,417,088. Reference is made to the identified patents for descriptions of the respective zeolites.

The acidity of the zeolite may be varied by conventional techniques including variation of the silica:alumina ratio, cation exchange e.g. with alkali metal cations to reduce acidity or by selective poisoning, especially with bulky poisons which do not enter the pore structure of the zeolite so that only the surface acidity is modified.

In order to improve the physical strength of the catalysts, the zeolite either on its own or combined with another catalytically active ingredient, is formulated with a matrix or binder in order to improve its crushing strength and attrition resistance. The zeolite will therefore generally be incorporated in a clay or other matrix material such as a synthetic metal oxide, especially silica, alumina, silica-alumina, magnesia or a combination of such oxides. Other metal oxides such as silica-magnesia, silica-zirconia, silica-thoria, silica-beryllia, silica-titania or ternary compositions such as silica-alumina-thoria, silica-alumina-zirconia, silica-alumina-magnesia and silica-magnesia-zirconia may also be used. Certain clays may also be used as binder materials, especially acid-treated clays which have superior activity. The zeolite together with any other catalytically active zeolite may be composited with the binder material in a conventional manner to produce the final matrixed catalyst. If a synthetic metal oxide such as alumina or silica or silica-alumina is used as the matrix, the zeolite component may be co-gelled with the matrix components or alternatively, a pre-formed zeolite may be added to a gel of the matrix prior to drying. Clays may suitably be composited with the zeolite component by slurrying the zeolite with the clay, followed by homogenisation of the slurry and spray drying of the mixture to produce the final matrixed catalyst. Naturally occurring clays which can be composited with the modified zeolite include those of the montmorillonite and kaolin families, which families include the sub-bentonites and the kaolins or others in which the main mineral constituent is halloysite, kaolinite, dickite, nacrite or anauxite. Such clays can be used in the raw state as originally mined or initially subjected to calcination, acid treatment or chemical modification. Techniques for compositing the zeolite with the oxide matrix materials are well established, for example, by extrusion and pelleting.

The relative proportions of zeolite and inorganic matrix may vary widely with the zeolite content ranging from between about 1 to about 99 percent by weight and more usually in the range of about 5 to about 80 percent by weight of the composite.

The zeolite component is conventionally composited with the matrix component by mulling or forming a slurry of the two components, suitably with water, to form a mixture which can be formed into the desired particles by the selected technique e.g. extrusion or pelletising. After forming into particles, the catalyst may be dried and activated, usually by calcination followed by any other selected treatments such as cation-exchange or impregnation in order to confer the desired catalytic properties, as described above. The noble metal component may be added during the compositing step in the form of a compound of the noble metal which can be converted to the catalytically active form during the subsequent treatment steps such as calcination or reduction e.g. in hydrogen.

In addition to the noble metal component, the zeolite and any binder, the present catalysts also include a compound containing a complex zirconium cation, especially oxalato- and hydroxalato complex cations. The complex cations may also contain other metals, especially aluminum. Thus, suitable zirconium complex cation compounds may include zirconyl compounds with the $ZrO^{2+}$ cation and specific compounds such as zirconyl acetate $Zr(OH)_2 \cdot (CH_3C_2)_2$, zirconium ammonium salts $Zr(NH_3)_4X_{6/n}$ where X is an anion of valency n especially halogen such as F or Cl, zirconyl carbonate $ZrOCO_3 \cdot xH_2O$, zirconium glycolate $H_2ZrO(C_2H_2O_3)_3$, zirconium lactate $H_4ZrO(CH_3CHOHCO_2)_3$, zirconium oxychloride $ZrOCl_2 \cdot 8H_2O$ (zirconyl chloride), zirconium phosphate $ZrO(H_2PO_4)_2 \cdot 3H_2O$, zirconyl sulfate $ZrO(H_2PO_4)_2(SO_4)_2 \cdot xH_2O$, zirconium tetracetylacetonate $Zr[OC \cdot CH_3 : CHCOCH_3]_4$, zirconyl hydroxychloride $ZrO \cdot (OH)Cl \cdot nH_2O$, zirconyl nitrate $ZrO(OH)NO_3$, zirconium hydroxychloride and zirconium aluminum hydroxychloride $Al_3ZR(OH)_9Cl_4$ and the reaction product of equimolar proportions of zirconium aluminum hyroxychloride with glycine are preferred.

The amount of the zirconium compound is generally from 1 to 25, preferably 2 to 10, weight percent based on the weight of the zeolite, The stabilizing component may be mixed with the zeolite component of the catalyst and any binders at any suitable stage in the manufacture of the catalyst, for example, by slurrying with the zeolite and binder prior to homogenization and drying. Alternatively, the stabilizer could be added to a gel of the binder containing added zeolite. The normal treatments carried out after drying of the catalyst such as ammonium and other cation exchange and, calcination or reduction may take place in the normal way.

A calcination step is conventionally carried out to activate the catalyst to remove residual organic compounds used as directing agents during the synthesis of the zeolites. Calcination at temperatures up to about 1000° F. (540° C.) is typical, usually in the range of 800°–1000° F. (425°–540° C.). During the calcination the zirconium complex compound is converted to another form dispersed through the catalyst with the noble metal component if this has already been added. It is believed that the zirconium is probably present as the oxide $ZrO_2$ in one of its structural forms. The amount of zirconium present in the finished catalyst will usually be 1 to 20, preferably 1 to 5 weight percent, as $ZrO_2$. Thus, the original zirconium-containing complex cation is probably no longer present after the calcination but its effect on the dispersability of the noble metal component persists in the finished catalyst.

The catalysts containing the aluminum hydroxychloride complexes exhibit improved physical strength together with improved hydrothermal stablitity and in addition, exhibit higher activity in catalytic cracking operations. As shown below, the zirconium complex cations also serve to improve the dispersability of noble metal components supported on the zeolite.

The present catalysts may be used in hydrocarbon processing where a metal supported on an active or inactive zeolite is needed for catalytic function. Thus, the present catalysts may be used in hydrogenation and dehydrogenation, hydrodesulfurisation, hydrodenitrogenation, hydrotreating, hydrofinishing, hydrodewaxing, hydrocracking and reforming. The conditions employed will be those appropriate to the selected reaction but because the present catalysts exhibit improved metal component dispersability, it may be possible to go to higher reaction temperatures if metal agglomeration problems have previously been limiting.

The catalysts may be regenerated and reactivated by conventional oxidative and hydrogen stripping techniques as described above. Although the present zirconium-containing catalysts exhibit improved dispersability characteristics, rejuvenation techniques may nonetheless be necessary. Thus, halogen rejuvenation may be employed as may the highly effective nitric oxide rejuvenation as described in co-pending application Ser. No. 089,054, filed Aug. 26, 1987 (Mobil Case 4386), to which reference is made for a description of the process.

EXAMPLE

A PdZSM-5 catalyst containing a zirconium complex cation compound was prepared by mulling 65 wt. percent ZSM-5 crystals with 0.39 wt. pct. Pd as $Pd(NH_3)_4Cl_2$ dissolved in an aqueous solution of an equimolecular reaction product of glycine and aluminum zirconium hydroxychloride $Al_3Zr(OH)_9Cl_4$ to provide 3.5 wt. percent zirconium as $ZrO_2$. To this was added alpha monohydrate alumina to provide 25.9 wt. percent alumina ($Al_2O_3$) after which mulling was continued to produce an extrudable mull which was extruded to form 0.03 inch (0.8mm) extrudates, the extrudate was calcined by heating at 5° F./min (2.8 C/min) to 900° F. (480° C.) for 3 hours in 3 vols/vol. catalyst/minute nitrogen and held at 900° F. (480° C.) while still passing nitrogen at the same rate. It was held for a further 1 hour at 900° F. (480° C.) in 3 vols./vol/min 50% $N_2$/50% air and then heated to 1000° F. (540° C.) at 5° F./min (2.8° C./min) and held at 1000° F. (540° C.) for 3 hours while passing 3v/v/min. air. The catalyst was designated Catalyst A and contained 0.39 wt. pct. palladium, in 65% ZSM-5, 32.5% $Al_2O_3$ and 2.5 wt. pct. $ZrO_2$.

For comparison, another catalyst was made by the same procedure without the addition of the zirconium compound. The calcined catalyst identified as Catalyst B contained 0.39 wt. pct. palladium in 65 wt. pct. ZSM-5 and 35 wt. pct. $Al_2O_3$.

The physical properties of the two catalysts are shown in Table 1 below.

TABLE 1

Physical Properties of PdZSM-5 Catalysts

| | Catalyst A | Catalyst B |
|---|---|---|
| Pd, wt % | 0.37 | 0.40 |
| Na, wt % | 0.05 | 0.03 |
| $ZrO_2$, wt % | 2.51 | 0.00 |
| Density, g/cc | | |
| Packed | 0.63 | 0.47 |
| Real | 2.65 | 2.64 |
| Particle | 1.09 | 0.83 |
| Surface Area, $M^2$/g | 232 | 330 |
| Pore Volume, cc/g | 0.54 | 0.82 |

TABLE 1-continued

Physical Properties of PdZSM-5 Catalysts

| | Catalyst A | Catalyst B |
|---|---|---|
| Crush, lb/inch$^2$ (kg./cm$^2$) | 95 (6.68) | 20 (1.41) |

The results in Table show that the zirconium containing catalyst has markedly superior crushing strength to the one which contains no zirconium.

To demonstrate the effect of zirconium incorporation on the stability of PdZSM-5 catalyst, a fresh sample of Catalyst A was treated with hydrogen at 800° F. (425° C.) for one hour to intentionally agglomerate Pd particles. The catalyst is designated as Catalyst C. A sample of Catalyst B was treated under identical conditions and is designated as Catalyst D. In another example, both Catalyst A and Catalyst B were treated with a more severe atmosphere of 80% hydrogen and 20% steam at 800° F. (425° C.) for one hour. These are designated as Catalyst E and Catalyst F, respectively.

The activity for hydrogenation of benzene to cyclohexane (BHA Test) on these catalysts was determined to compare their catalytic performance. In this test, a gaseous mixture containing 100:1 molar ratio of hydrogen and benzene was flowed through a vertical quartz ("Vycor" trademark) tubular reactor, ¼ inch (6mm) ID and 5 inches (12 cm) long, containing about 250 mg of the catalyst, at a hydrogen flow rate of 200 cc/min, a total pressure of 1 atm, and at temperatures between 75° F. (24° C.) and 300° F. (150° C.), depending on the activity of the catalyst. All catalysts were treated with hydrogen at a maximum temperature of 200° C. (392° F.) before the BHA test.

TABLE 2

Benzene Hydrogenation Activity of PdZSM-5 Catalysts

| Catalyst | BHA at 100° C. Pretreatment | Mole/mole Pd/hr |
|---|---|---|
| A | Fresh | 23.8 |
| B | Fresh | 20.4 |
| C | Reduced, ($H_2$, 800° F. 425° C./1 hr) | 8.7 |
| D | Reduced, 4.1 ($H_2$, 800° F. 425° C./1 hr) | 4.1 |
| E | Reduced (80% $H_2$/20% steam, 800° F./425° C./hr) | 5.9 |
| F | Reduced (80% $H_2$/20% steam, 800° F./425° C./1 hr) | 2.4 |

The sintered Pd catalysts were then subjected to nitric oxide rejuvenation by exposure to nitric oxide at 390° F. (200° C.), 1 atm, for 2.5 hours. The BHA was then redetermined and the results are given in Table 3 below. The BHA activity increased after rejuvenation to levels higher than those of the fresh samples.

TABLE 3

Benzene Hydrogenation Activity of Rejuvenated Catalysts (NO Treatment at 200° C., 2.5 hr.)

| | $Al_2O_3$/$ZrO_2$ Support | | $Al_2O_3$ Support | |
|---|---|---|---|---|
| Treatment | BHA | Catalyst | BHA | Catalyst |
| Fresh | 23.8 | A | 20.4 | B |
| Reduced ($H_2$, 800° F. (425° C.), 1 hour | 8.7 | C | 4.1 | D |
| NO treated | 36.3 | | 40.5 | |
| Steamed (80% $H_2$/20% steam, 800° F. (425° C.)/1 hr | 5.9 | E | 2.4 | F |

TABLE 3-continued

Benzene Hydrogenation Activity of Rejuvenated Catalysts
(NO Treatment at 200° C., 2.5 hr.)

| Treatment | Al₂O₃/ZrO₂ Support | | Al₂O₃ Support | |
| --- | --- | --- | --- | --- |
| | BHA | Catalyst | BHA | Catalyst |
| NO treated | 19.1 | | 19.6 | |

We claim:

1. A method of improving the properties of a noble-metal containing catalyst which comprises:
   (i) forming a catalyst composition of a zeolite and a compound containing a complex cation of zirconium,
   (ii) forming the catalyst composition into a solid catalyst and
   (iii) incorporating a noble metal catalytic component with the catalyst.

2. A method according to claim 1 in which the zeolite comprises an aluminosilicate zeolite.

3. A method according to claim 2 in which the zeolite comprises an intermediate pore size zeolite.

4. A method according to claim 3 in which the zeolite comprises ZSM-5 or ZSM-23.

5. A method according to claim 2 in which the zeolite comprises zeolite beta.

6. A method according to claim 1 in which includes a matrix material.

7. A method according to claim 6 in which the matrix material comprises alumina, silica or silica-alumina.

8. A method according to claim 1 in which the zirconium compound is present in an amount of from 1 to 20 weight percent (as $ZrO_2$) of the catalyst.

9. A method according to claim 8 in which the zirconium compound is present in an amount of from 1 to 5 weight percent (as $ZrO_2$) of the catalyst.

10. A method according to claim 1 in which the zirconium compound comprises zirconium oxychloride.

11. A method according to claim 1 in which the zirconium compound comprises aluminum zirconium hydroxychloride.

12. A method according to claim 1 in which the zeolite and the compound containing the complex cation of zirconium are formed into the catalyst composition together with a noble metal component after which the catalyst composition is formed into solid catalyst particles.

13. A method according to claim 12 in which the solid catalyst particles are activated by calcination.

14. A method according to claim 12 in which the catalyst composition includes a matrix material for the catalyst.

15. A method according to claim 1 in which the noble metal is incorporated into the catalyst by impregnation into the solid catalyst composition.

16. A method of producing a noble metal containing zeolite catalyst of improved dispersability characteristics which compises:
   (i) forming a catalyst composition of at least one zeolite, a catalyst matrix material, a noble metal component and a compound containing a complex cation of zirconium,
   (ii) forming the catalyst composition into solid catalyst particles;
   (iii) calcining the catalyst particles.

17. A method according to claim 16 in which the compound containing the complex cation of zirconium comprises aluminum zirconium hydroxychloride.

18. A method according to claim 16 in which the compound containing the complex cation of zirconium comprises a reaction product of glycine and aluminum zirconium hydroxychloride.

19. A method according to claim 16 in which the noble metal comprises palladium or platinum.

20. A method according to claim 16 in which the matrix material comprises silica, alumina or silica-alumina.

* * * * *